United States Patent [19]

Skinner

[11] 4,081,836

[45] Mar. 28, 1978

[54] LUMINANCE SIGNAL PROCESSOR FOR PROVIDING SIGNAL ENHANCEMENT

[75] Inventor: Kenneth R. Skinner, Fort Wayne, Ind.

[73] Assignee: The Magnavox Company, Fort Wayne, Ind.

[21] Appl. No.: 746,039

[22] Filed: Nov. 30, 1976

[51] Int. Cl.² ............................................. H04N 5/14
[52] U.S. Cl. .................................................. 358/166
[58] Field of Search .................... 358/37, 38, 166, 162, 358/96, 904

[56] References Cited

U.S. PATENT DOCUMENTS

| | | | |
|---|---|---|---|
| 3,153,207 | 10/1964 | Brown | 358/166 X |
| 3,836,707 | 9/1974 | Murakami et al. | 358/31 |
| 3,849,792 | 11/1974 | Holzrichter | 358/166 |
| 3,931,637 | 1/1976 | Carpenter | 358/38 |
| 3,984,631 | 10/1976 | Avicola | 358/904 X |

*Primary Examiner*—Robert L. Richardson
*Attorney, Agent, or Firm*—George R. Pettit

[57] ABSTRACT

Apparatus is provided for automatically peaking a luminance signal in response to the signal-to-noise ratio of a received signal. Manual adjustment means are also provided whereby the luminance signal may be "peaked" to increase the slope of transitions in the luminance signal, or "depeaked" whereby the slope of transitions of the luminance signal is decreased.

10 Claims, 4 Drawing Figures

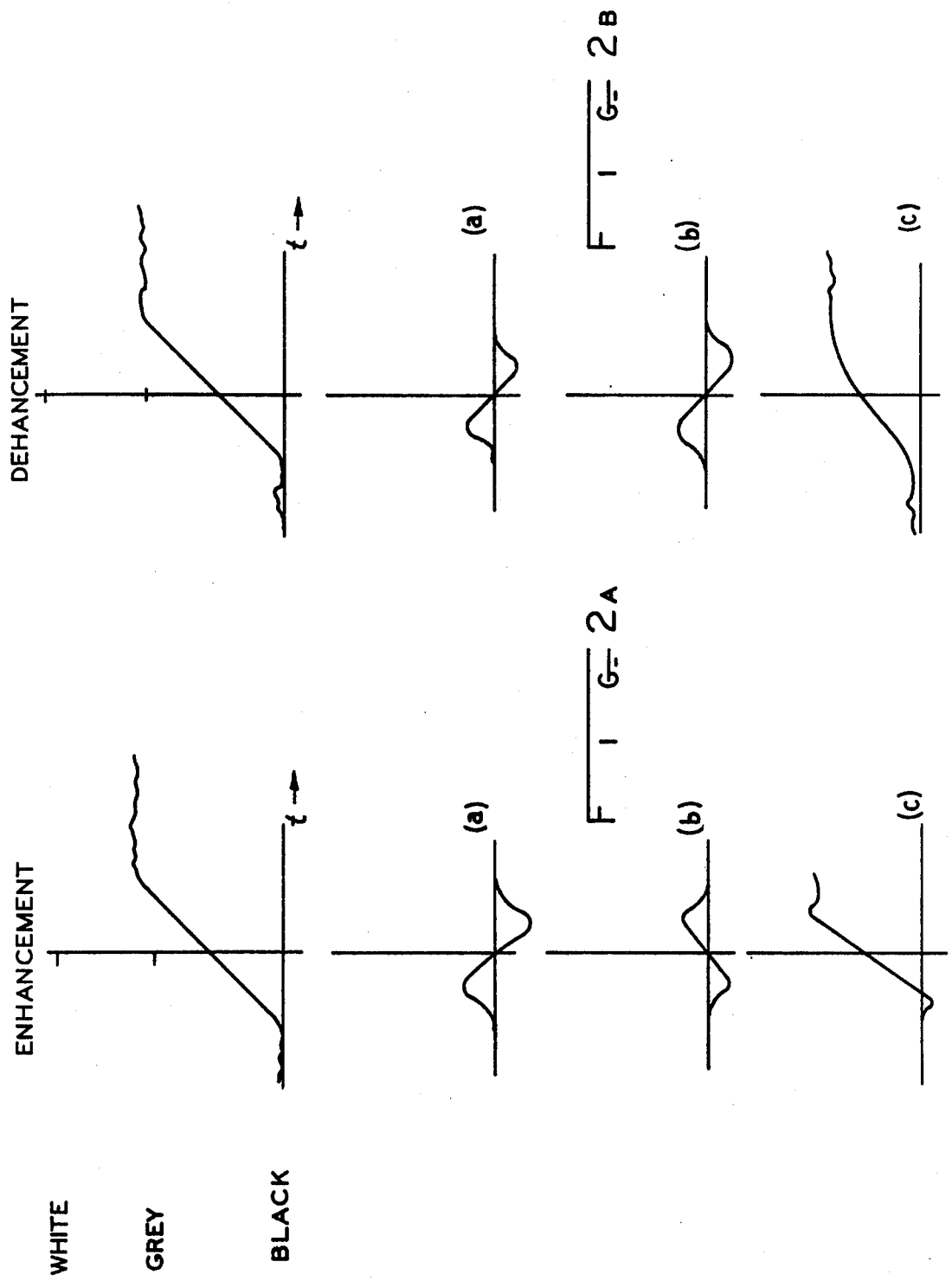

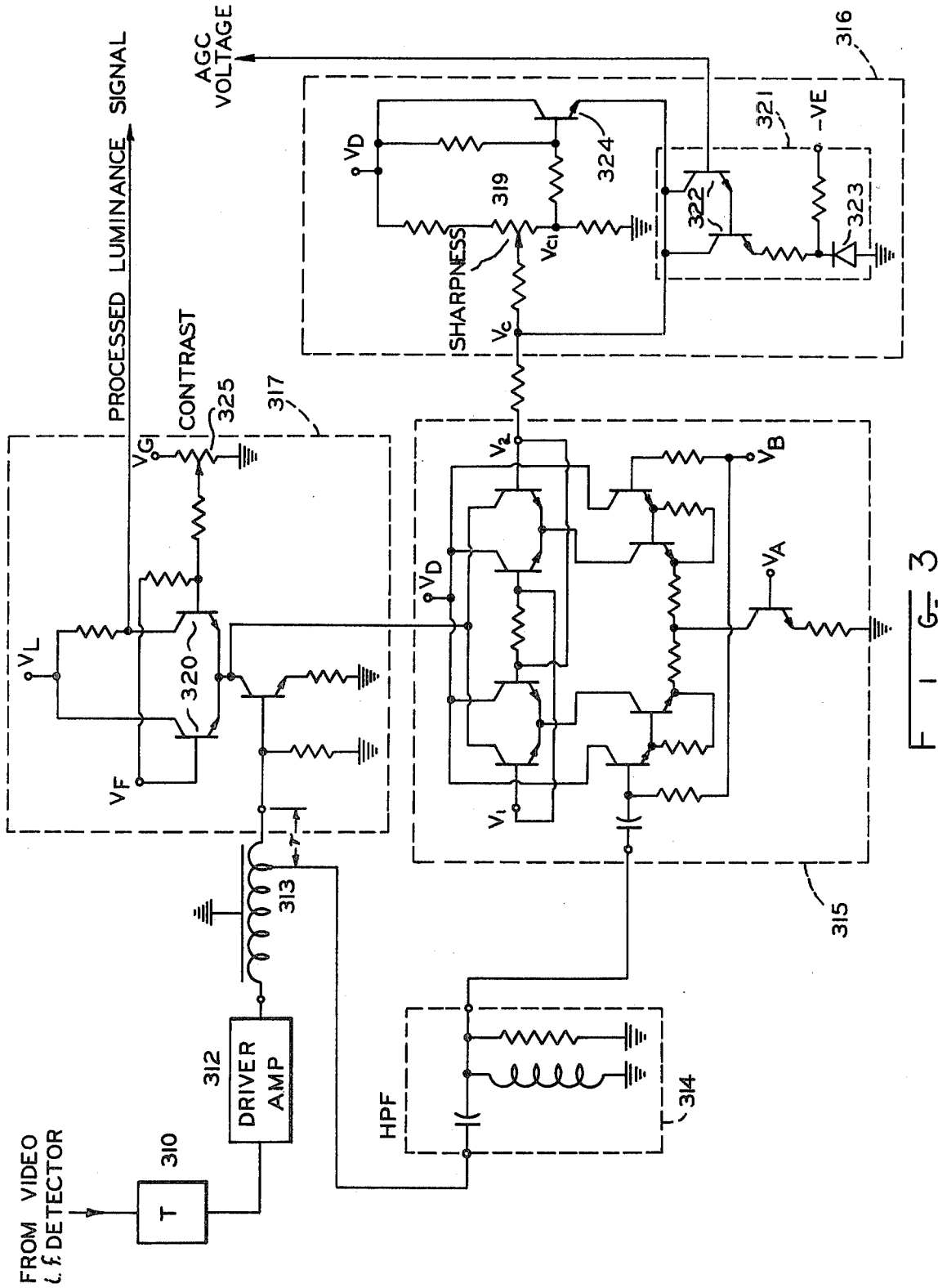

LUMINANCE SIGNAL PROCESSOR FOR PROVIDING SIGNAL ENHANCEMENT

BAKCGROUND OF THE INVENTION

This invention relates to the processing of luminance signals in a television receiver. Specifically, apparatus is described for automatically changing the peaking of a received luminance signal in response to the signal strength of a received signal.

It is known in the television art that the quality of received pictures may be enhanced by applying a technique referred to as "peaking" in the luminance signal channel. The luminance signal, containing contrast information for the received picture, may be peaked whereby voltage transitions of the luminance signal representing changes in contrast are processed to increase the slope of the transition. Increasing the slope of luminance signal transitions tends to cause the picture sharpness to improve. The reason for this is that band limiting circuitry in both the transmitter and receiver of television signals tends to reduce the slope of luminance signal transitions, thereby decreasing the information contained in each luminance signal transition. The peaking technique is used in the television transmitter art as "aperture correction" and is also employed in television receivers. Prior art peaking systems require manual adjustments of the peaking level by the individual operator of a television receiver.

A number of factors change the peaking requirement for the luminance signal channel. One condition which changes the peaking requirements considerably is the signal level of a received signal. The peaking technique works well with signals having a sufficient signal-to-noise ratio. However, signals having a poor signal-to-noise ratio are not in general improved by peaking the luminance signal. The additional peaking for signals having poor signal-to-noise ratio merely increases the noise visible on the displayed picture. Therefore, a desirable feature of a peaking system would be to automatically reduce the peaking when signals of poor signal-to-noise ratio are being received.

Not only does reduced peaking offer a better quality picture where received signals have a low signal-to-noise ratio, but it has been found experimentally that decreasing the slope of the original luminance signal transition or, "depeaking" is desirable. This depeaking causes a "smearing" of the displayed picture producing a more pleasing picture than is otherwise available under weak signal conditions. Therefore, a peaking system which would automatically depeak or reduce the slope of received luminance signal transitions under these conditions would be desirable.

SUMMARY OF THE INVENTION

It is an object of this invention to provide a correcting signal for peaking or depeaking the luminance signal in a television receiver.

It is another object of this invention to provide control means for manually varying the peaking of a signal.

It is a further object of this invention to automatically increase or decrease the peaking of a luminance signal in accordance with the signal-to-noise ratio (S/N) of a received signal.

In accordance with the invention, apparatus is provided for increasing and decreasing the peaking of a luminance signal. In one embodiment, a correcting signal for combining with the luminance signal is developed by differentiating the luminance signal. The correcting signal is supplied to an amplifier for controlling the amplitude and polarity of the correcting signal before combining with the luminance signal. The magnitude and polarity of the correcting signal is controlled in one embodiment in accordance with the signal-to-noise ratio of a received signal. Manual means for adjusting the magnitude and polarity of the correcting signal are also provided in one embodiment of the present invention.

DESCRIPTION OF THE FIGURES

FIG. 2a illustrates the effect of the correcting signal on the luminance signal during the enhancement mode.

FIG. 2b illustrates the effect of the correcting signal on the luminance signal during the dehancement mode.

FIG. 3 is a detailed schematic drawing showing specific circuitry for implementing the signal processing circuit of FIG. 1.

DESCRIPTION OF THE PREFERRED EMBODIMENT

Figure 1:
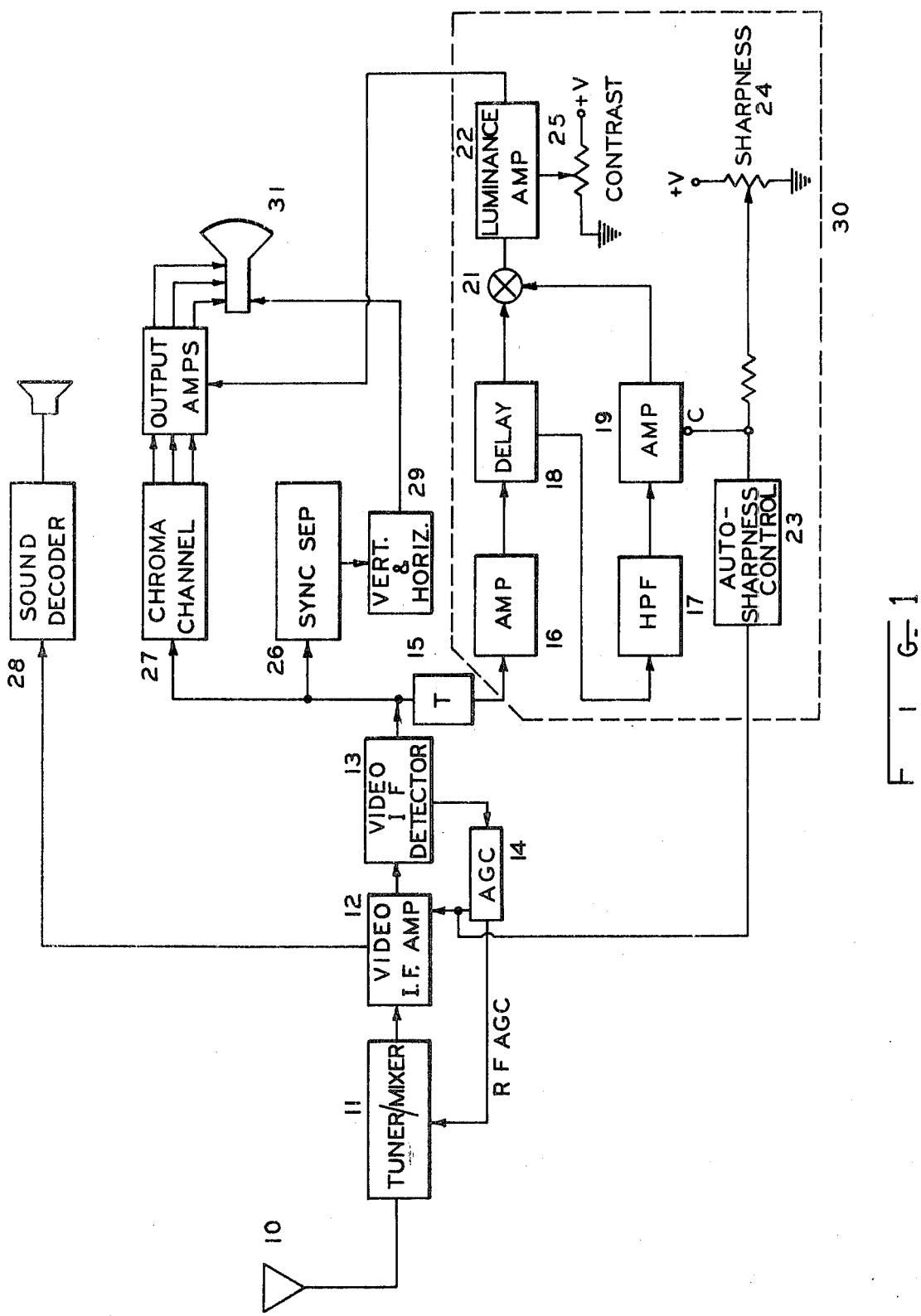
FIG. 1 is a block diagram of a television receiver incorporating an embodiment of this invention.

Referring now to FIG. 1, an embodiment of the signal processing apparatus of this invention is shown incorporated in a television receiver. The television receiver shown is a color television of conventional design. A tuner/mixer circuit 11 receives r.f. energy containing sound, color, and brightness information from an antenna 10. The sound information is provided by the video i.f. amplifier 12 to sound decoder circuitry 28. A video i.f. detector 13 receives the picture information from video i.f. amplifier 12 for further signal processing. The AGC detector 14 provides a d.c. signal for controlling the gain of the tuner/mixer 11 combination as well as the gain of the video i.f. amplifier 12. This voltage, referred to as an AGC voltage by those skilled in the art, may be considered as an indication of the received signal level.

The video signal supplied by video i.f. detector 13 is further processed by the luminance signal channel, chroma signal channel 27, and synchronization separation circuitry 26. The chroma signal channel converts color information in the video i.f. detector 13 output signal into control voltages for varying the picture color displayed on a kinescope 31. Synchronization separation circuitry 26 removes the synchronization signals for controlling the vertical and horizontal deflection drives 29 on kinescope 31.

The luminance signal channel contains a filter trap 15 and a signal processor 30. The filter trap 15 removes any chroma signal centered near 3.58 MHz from the video i.f. detector 13 output signal. The signal produced by this filter trap 15 is the uncorrected luminance signal. The filter trap 15 is of conventional design and is used in many commercially available television receivers.

The luminance signal from filter trap 15 is applied to the input of a driver amplifier 16. Driver amplifier 16 provides enough power gain to feed the remaining circuitry which modifies the luminance signal.

A delay means 18 normally present in color television receivers for compensating any time difference between luminance and chroma signals is also used in FIG. 1 to split the luminance signal. The split signals have a time differential such that delays introduced by high pass filter means 17 and amplifier 19 are compensated for before recombining by summing circuit 21.

The high pass filter 17 produces a correcting signal for modifying the luminance signal supplied by amplifier 16. The magnitude and polarity of the correcting signal is controlled by amplifier 19. Amplifier 19 has a control input terminal operatively connected to the i.f. AGC voltage and to a sharpness control 24. Depending upon the i.f. AGC voltage level and the sharpness control 24 setting, the correcting signal will be either added or subtracted from the luminance signal supplied by amplifier 16.

The correcting signal and luminance signal having been delay compensated are combined in summing circuit 21. The modified luminance signal is thereafter amplified by luminance amplifier 22. A contrast control 25 alters the gain of this amplifier 22 providing an adjustment to picture contrast.

The effect of signal processing unit 30 on a luminance signal may be understood by referring to FIGS. 2a and 2b. FIG. 2a shows a typical luminance signal during a transition from black signal level to a grey signal level. The slope of the transition determines the sharpness of the edges of the scene displayed on the kinescope. Luminance signals representing scenes of high detail tend to have a steeper slope associated with the transition of the luminance signal. The bandwidth of the circuitry used for transmitting and receiving the luminance signal tends to reduce the slope of the transition thereby decreasing the "sharpness" of the displayed scene.

In order to enhance the sharpness of the displayed picture, a correcting signal may be added to the luminance signal which tends to increase the slope of the luminance signal transition. The increase in slope is known in the art as "peaking". FIG. 2a illustrates the enhancement of a luminance signal by the signal processing unit 30 of FIG. 1.

The high pass filter 17 provides a signal which is the time differential of the luminance signal. The differential signal shown as (a) in FIG. 2a may be subtracted from the luminance signal to improve the rise time of the luminance signal transition thereby enhancing the sharpness of the displayed picture represented by the processed luminance signal. The correcting signal derived from high pass filter 17 is inverted by amplifier means 19 as shown in illustration (b) of FIG. 2a. Those skilled in the art will recognize that combining this inverted, differentiated luminance signal with the main luminance signal will result in a decreased rise time for the luminance signal transition as shown in (c).

The aforementioned enhancement process or "peaking" for decreasing the rise time of luminance signal transitions is beneficial only where the signal-to-noise ratio of the luminance signal being processed is substantially better than 22 db. As the signal-to-noise ratio of the luminance signal decreases, the enhancement process illustrated in FIG. 2a tends to emphasize the noise visible on the displayed picture. In fact, those skilled in the art will recognize that the enhancement process or peaking process clearly degrades the picture quality when weak signals are being received. Therefore, it is desirable to "dehance" the slope of luminance signal transition causing a longer transition rather than a fast transition between luminance signal levels. This "depeaking" process causes a smeared picture in lieu of a sharp or crisp picture obtained by peaking.

During the processing of very weak signals, the correcting signal shown in (a) of FIG. 2a is added to the luminance signal rather than subtracted. The amplifier 19 therefore must be capable of subtracting the correcting signal derived from the high pass filter as well as adding it to the delayed luminance signal.

FIG. 2b illustrates the operation of the signal processor 30 during the dehancement mode. The slope of a processed luminance signal having been reduced is shown in (c) of FIG. 2b.

Referring again to FIG. 1, the control input to the amplifier 19 for determining the polarity and magnitude of the correcting signals to be combined with the main luminance signal is shown controlled by the i.f. AGC level of the television receiver through an auto sharpness control 23, and a manual sharpness control 24. The i.f. AGC level is a function of signal strength, particularly for moderate to weak signal levels, as will be recognized by those skilled in the art. It is known to those skilled in the art that the signal strength is indicative of the signal-to-noise ratio of the received television signal. Therefore, the i.f. AGC signal provided by the AGC detector 14 may be used to control the magnitude and polarity of the correcting signal to be combined with the main signal, thereby determining whether the "enhancement" or "dehancement" mode will be selected. It is understood that other means may be used to measure the signal-to-noise ratio of a received signal which in turn may be used to control the signal processor 30.

The apparatus shown in FIG. 1, as will be explained with reference to FIG. 3, is constructed so that signals below a certain signal level will provide reduced peaking. Signals above a predetermined signal level will cause the correcting signal to be subtracted or added to the main luminance signal depending on the setting of the sharpness control 24.

The i.f. AGC voltage is compared by auto sharpness control 23 to a predetermined reference level. If the AGC voltage exceeds this reference voltage, the peaking of the luminance signal is reduced. The amount of reduction in the peaking level is dependent upon the degree to which the signal-to-noise ratio of the received signal has deteriorated.

Referring now to FIG. 3, a detailed schematic representation of the signal processing unit 30 of FIG. 1 is shown. The luminance signal supplied by trap 310 enters driver amplifier 312 and tapped delay line 313. The driver amplifier 312 is of conventional design supplying enough signal strength to overcome the path loss incurred by the signal entering delay line 313. Signal from the input of delay line 313 enters high pass filter 314. The high pass filter 314 is of conventional design being a second order Butterworth filter known to those skilled in the art. The filter cut-off frequency and damping are suitably chosen so that signals from the filter will be approximately the second time derivative of the input luminance signal. Other means for deriving a correcting signal will be obvious to those skilled in the art.

The amplifier 315 has the capability of amplifying the correcting signal and inverting the signal upon the application of a suitable control voltage. This amplifier is described more fully in a copending application filed the same day as the present application, Attorney Docket 75C-535, entitled "Gain Polarity Selectable Amplifier", by Leonard Suckle. The amplifier described in the aforementioned application is capable of amplifying and changing the polarity of the amplified signal depending upon the voltage difference $V_2 - V_1$. When $V_2$ exceeds $V_1$ the correcting signal will be subtracted from the main luminance signal, and when $V_1$ is greater than $V_2$, the correcting signal will be added to the main luminance signal. The magnitude of the correcting signal is determined by the magnitude of the difference between $V_1$ and $V_2$. Thus, when $V_1$ and $V_2$ are equal, no correcting signal is combined with the luminance signal.

Control of the correcting signal is provided by the circuitry shown in broken line 316. Signals having a moderate to strong signal-to-noise ratio have the amount of peaking setting determined by potentiometer 319. Signals which are considered to have marginal to poor signal-to-noise ratio have the peaking setting determined automatically by the level of AGC voltage present in the television receiver.

The threshold level establishing the point at which the peaking control switches from a manual control to automatic is determined by the bias voltage appearing at the emitter of Darlington transistor pair 322. In the embodiment shown, a diode 323 establishes a bias voltage of about $-0.65$ volts. When the AGC voltage exceeds 0.5 volts, the collectors of Darlington pair 322 pulls current which lowers the control voltage Vc. As the AGC voltage continues to rise, indicating a deteriorating signal-to-noise ratio of the received signal, the control voltage Vc will be lowered causing less and less peaking. Transistor 324 clamps the minimum control voltage Vc attained by the action of the AGC to the lowest voltage which the manual sharpness control 319 will provide ($Vc_1$).

The AGC voltage applied to circuit 316 causes "smearing" or depeaking of the displayed picture only when the AGC level is greater than 0.5 volts. In the television receiver incorporating this embodiment, this voltage corresponds to a signal-to-noise ratio of about 22 db. Those skilled in the art will recognize that other threshold signal-to-noise ratio levels establishing the signal level at which AGC voltage controls the peaking may be selected by altering the bias voltage at the emitter of Darlington transistor pair 322.

Although the preferred embodiment has been described in terms of a manual control for establishing the peaking level of strong signals and an automatic control of the peaking level for weak signals, those skilled in the art could modify the preferred embodiment so that the peaking is dependent upon the level of AGC voltage for both strong and weak signals.

Also, the preferred embodiment has been described in terms of the use of the AGC voltage for causing an automatic change in peaking. Those skilled in the art will recognize that other signal strength indicating voltages may be used with the present invention to effect a changing in peaking.

The summation of the correcting signal with the delayed luminance signal is accomplished by the amplifier circuitry shown by Block 317. The amplifier 317 also provides for a contrast control by providing means for increasing or decreasing the magnitude of the processed luminance signal. The amplifier 317 shown is a known differential amplifier whereby the signal to be amplified enters the emitter of the differential transistor pair 320. The voltage difference on the base connections of the differential transistor pair 320 determines the level of the output signal recovered from a collector of the transistor pair 320. Thus, by using a potentiometer 325 to provide a variable voltage to the base of one transistor while holding the second transistor base voltage constant, the contrast of the displayed picture may be altered.

Thus there is described with respect to one embodiment a signal processing means for automatically depeaking a luminance signal is response to the decrease in signal-to-noise ratio of the received signal. Additionally the embodiment shown allows for manual dehancement as well as manual peaking or enhancement of the luminance signal transition. Those skilled in the art will recognize other means for automatically controlling the peaking of the luminance signal without departing from the claims which follow.

What is claimed is:

1. In a television receiver, a luminance signal processing apparatus comprising:
   (a) a source of luminance signals:
   (b) means for producing a delayed luminance signal, said means being operatively connected to said source of luminance signals;
   (c) means for deriving a correction signal, said means being operatively connected to said source of luminance signals;
   (d) means for controlling the polarity and amplitude of said correction signal in response to a voltage level;
   (e) voltage selection means, said means operatively connected to said means for controlling whereby the magnitude and polarity of said correcting signal may be changed by said voltage selection means; and
   (f) means for combining said correction signal with said delayed luminance signal.

2. The apparatus of claim 1 further comprising:
   (a) means for detecting the signal-to-noise ratio of a signal received by said television receiver; and
   (b) means for changing the polarity and magnitude of said correction signal when a received signal is below a threshold signal-to-noise ratio, said means being operatively connected to said means for detecting the signal-to-noise ratio of a received signal.

3. The apparatus of claim 2 wherein said means for detecting the signal-to-noise ratio of a received signal is an AGC voltage detector of said television receiver.

4. In a television receiver, an apparatus for controlling the frequency response of the luminance signal comprising:
   (a) a source of luminance signals;
   (b) signal delaying means coupled to said source of luminance signals for producing a delayed luminance signal;
   (c) second order high pass filter means coupled to said signal delaying means for producing a time derivative signal;
   (d) amplifier means coupled to said second order high pass filter means for controlling said time derivative signal, said amplifier means having a d.c. control input for changing the magnitude and polarity of said time derivative signal;
   (e) means for providing a voltage indicative of the signal strength of a received signal, said voltage being applied to said d.c. control input; and
   (f) means for combining said delayed luminance signal with said controlled time derivative signal to produce an output signal.

5. The apparatus of claim 1 further comprising manually operable voltage selection means for supplying a selectable d.c. voltage to said d.c. control input.

6. In a television receiver, an apparatus for controlling the frequency response of the television luminance signal comprising:

(a) a source of luminance signals;

(b) signal delaying means coupled to said source of luminance signals for producing a delayed luminance signal;

(c) differentiating means coupled to said source of luminance signals for producing a time derivative luminance signal;

(d) amplifier means coupled to said differentiating means for providing a controlled time derivative luminance signal, said amplifier means having a d.c. control input for changing the magnitude and polarity of said time derivative luminance signal;

(e) means for manually selecting a d.c. voltage;

(f) means for applying said d.c. voltage to said d.c. control input; and (g) means for combining said delayed luminance signal with said controlled time derivative luminance signal to produce an output signal.

7. The apparatus of claim 6 further comprising means for changing said d.c. voltage in accordance with the signal-to-noise ratio of received signal when said received signal is below a threshold signal-to-noise ratio.

8. A signal processor for controlling the frequency response of a video signal comprising:

(a) a source of video signal;

(b) differentiating means for deriving a correction signal from said video signal;

(c) means for controlling the magnitude and polarity of said correction signal; and (d) means for combining said correction signal with said video signal whereby said video signal is modified according to the magnitude and polarity of said correction signal.

9. The apparatus of claim 8 wherein said means for controlling the magnitude and polarity of said correction signal is responsive to the signal-to-noise ratio of said video signal.

10. The apparatus of claim 9 further comprising means for manually changing the magnitude and polarity of said correction signal.

* * * * *